Feb. 20, 1923.

E. C. HANSON

AIRCRAFT LANDING STATION

Filed Mar. 5, 1919

Witness
J. B. Brady
Chas. L. Griesbauer

Inventor
Earl C. Hanson

By

Patented Feb. 20, 1923.

1,446,385

UNITED STATES PATENT OFFICE.

EARL C. HANSON, OF WASHINGTON, DISTRICT OF COLUMBIA.

AIRCRAFT-LANDING STATION.

Application filed March 5, 1919. Serial No. 280,686.

*To all whom it may concern:*

Be it known that I, EARL C. HANSON, a citizen of the United States, residing at Washington, in the District of Columbia, have invented certain new and useful Improvements in Aircraft-Landing Stations, of which the following is a specification.

My invention relates to a system to facilitate the landing of aircraft.

The object of my invention is to provide a field on which aircraft may land which field can be readily located by the aircraft while in flight.

Another object of this invention is to establish a wireless signalling system in combination with the landing field which will radiate energy to be received by apparatus contained on the aircraft.

A further object of this invention is to provide an illuminated landing zone positioned in the center of the landing station.

A still further object of this invention is to provide the combination of a radio compass signal system to guide airplanes in flight, a radio telegraphic and telephonic signalling station together with means for increasing the comforts of passengers traveling by aerial navigation.

Referring to the drawings:—

Figure 1 is a plan view of the landing station;

Figure 2 indicates an airplane equipped with wireless receiving apparatus;

Figure 1:
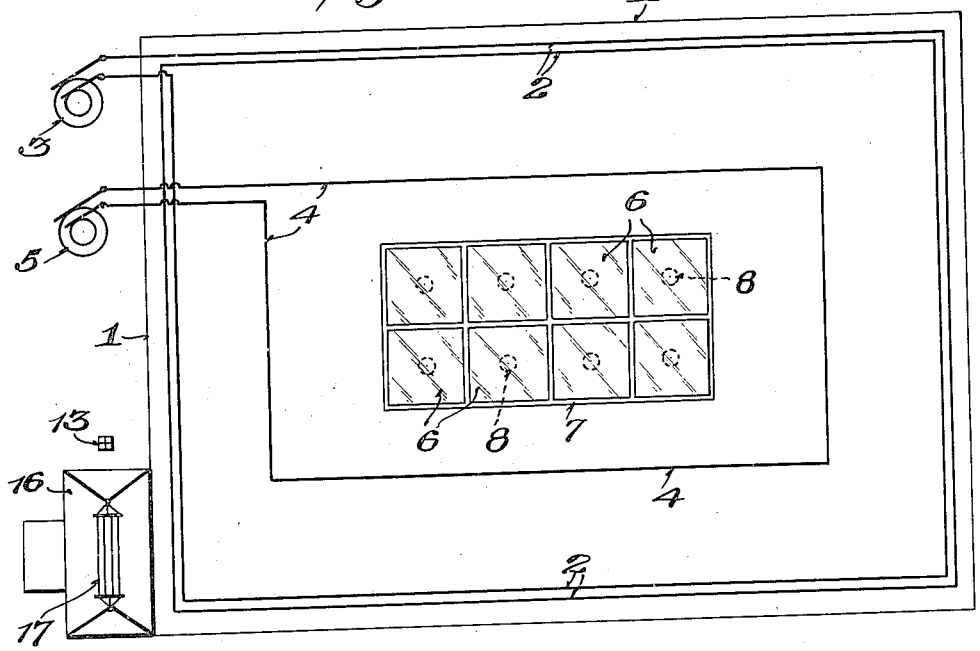

Referring particularly to Figure 1, the numeral 1 indicates the landing field of the aircraft landing station constructed preferably of solid material accurately leveled and equipped with drainage systems. 2 represents a plurality of insulated electric conductors located at the outer edges of the field and connected to a source of alternating current 3. 4 indicates a second loop of insulated electric conductors positioned nearer the center of the landing field and connected to a separate alternating current source 5. Within loop 4 and at the center of the field I have shown an illuminated landing zone. This zone comprises a series of translucent sections 6 supported in a suitable framework 7. This illuminated zone is level with the surface of the field. Beneath sections 6 there are placed suitable lighting means 8, such that the entire translucent zone is rendered visible from above through darkness or heavy fog.

The landing station is also provided with hangars, oil and gas service department, comfort facilities, a cafe, telephone booths, long distance radio telephone and telegraph installation with antenna shown at 17, all represented as enclosed in building 16.

Reference character 13 designates a radio compass signalling station located within the limits of the landing station. This radio compass will be more fully described hereinafter as set forth in Figure 4.

Figure 2:
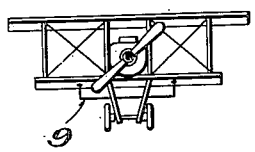

Figure 2 indicates an airplane provided with a looped electrical conductor 9, connected to signalling apparatus contained in the air plane.

Figure 3:
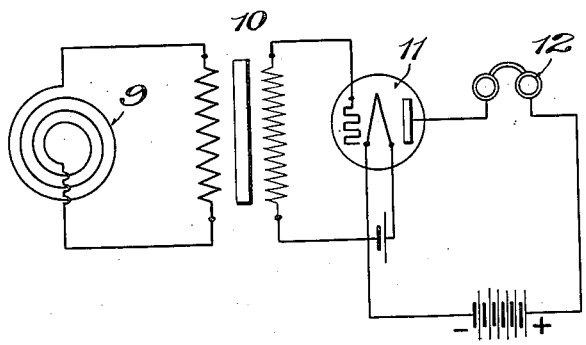
Figure 3 is a wiring diagram of one form of wireless receiving apparatus adapted to be installed on aircraft.

Figure 3 shows the wiring diagram of one form of apparatus adapted to be installed on the aircraft. The looped conductor 9 is connected to the terminals of the primary of an iron core transformer 10, the secondary of which is directly connected in circuit with the usual form of vacuum tube amplifier 11 having the customary plate circuit with recording telephone 12. The circuit disclosed permits response to audio-frequencies corresponding to frequencies generated in loop circuits 2 and 4 located in plane with the landing field.

Figure 4:
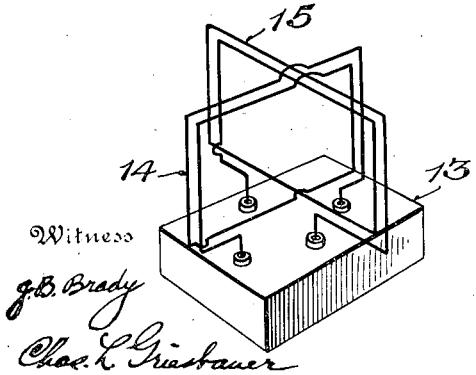
Figure 4 shows diagrammatically a radio compass signalling system required to guide the planes in proper course.

Figure 4 shows the radio compass signalling station represented by 13, in Figure 1. The signalling apparatus is enclosed in casing 13 and is provided with fixed coils 14 and 15 arranged at 90° to each other and positioned in vertical planes. The coils are arranged in predetermined directive lines such that signals transmitted will be propagated in lines with the course of the aircraft between communicating stations in separated cities.

In the operation of the present landing station loops 2 and 4 are supplied with alternating current at different frequencies having different degrees of strength such that ing different degrees of strength such that electro-magnetic energy will be projected from loop 2 at high frequency and with relatively great strength while energy projected from loop 4 will have a lower frequency and will be of weaker intensity. This combination of loops projecting energy at different frequencies to elevations of different heights provides means for aircraft approaching the landing station to readily locate the landing field and determine immediately the elevation of the aircraft from the field. For example, the aviator wearing telephone receiver 12 within a helmet hears at a high elevation the audio frequency signal projected from loop 2 having a characteristic note and upon further descent comes within the field of energy projected by loop 4 having a different characteristic sound.

The heights to which the energy from the two loops is projected is suitably regulated in accordance with the landing requirements of the particular forms of aircraft employed for aerial navigation. By providing the landing field with an illuminated center zone the location of the landing field from aircraft in flight and the subsequent landing thereof in darkness and heavy fog, is further facilitated. The convenience and comforts of individuals travelling by aerial routes is provided for by a accommodations included in building 16 together with extensive facilities for the fueling, maintenance, and housing of aircraft.

While I have described the loop signalling system based on the audio frequency principle and have disclosed a circuit for receiving such audio frequencies on aircraft, it is obvious that radio frequency systems could be substituted without departing from the spirit of the invention.

What I claim is:—

1. In an airport the combination with a landing field, of a plurality of loop conductors connected to separate sources of different audio frequency electrical energy, said energy being converted into magnetic lines of force and projected upwards from the landing field to different altitudes, and means for receiving and amplifying such magnetic energy on aircraft above said field, substantially as described.

2. In an airport the combination of a landing field with a plurality of loop conductors positioned in the plane of said field and energized by separate sources of differing audio frequency energy, said energy being converted into magnetic lines of force and projected upwards from the landing field to different altitudes, and a closed loop carried by aircraft connected to a vacuum tube amplifier actuating a signal responsive device when the aircraft comes within the field of magnetic energy above the landing field as described.

3. In an airport, the combination with a landing field, of means on said field for projecting upward magnetic energy of different audio frequencies, one part of said magnetic energy of relatively high audio frequency and great strength to warn the aviator of his approach to the station at a given altitude, and the other part of said magnetic energy of relatively low audio frequency and less strength to warn the aviator of his approach to the station at a lower altitude, and a closed loop arranged on aircraft and connected to the input side of a vacuum tube amplifier adapted to intensify the received signals to actuate a responsive device and produce a clearly audible note above extraneous noises, substantially as described.

In testimony whereof I affix my signature.

EARL C. HANSON.